(12) United States Patent
Sumida

(10) Patent No.: US 8,895,089 B2
(45) Date of Patent: Nov. 25, 2014

(54) SEALED BATTERY

(75) Inventor: Takashi Sumida, Kyoto (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 301 days.

(21) Appl. No.: 13/333,266

(22) Filed: Dec. 21, 2011

(65) Prior Publication Data

US 2012/0164495 A1    Jun. 28, 2012

(30) Foreign Application Priority Data

Dec. 22, 2010    (JP) ................. 2010-285490

(51) Int. Cl.
| | | |
|---|---|---|
| *H01M 2/04* | (2006.01) | |
| *H01M 2/12* | (2006.01) | |
| *H01M 2/34* | (2006.01) | |
| *H01M 10/42* | (2006.01) | |
| *H01M 2/08* | (2006.01) | |
| *H01M 2/22* | (2006.01) | |

(52) U.S. Cl.
CPC ............ *H01M 2/348* (2013.01); *H01M 2/0473* (2013.01); *H01M 2/1241* (2013.01); *H01M 2200/106* (2013.01); *H01M 2/0404* (2013.01); *H01M 10/425* (2013.01); *H01M 2/22* (2013.01); *Y02E 60/12* (2013.01); *H01M 2/08* (2013.01); *H01M 2/0469* (2013.01)
USPC ........................................................ 426/56

(58) Field of Classification Search
None
See application file for complete search history.

(56) References Cited

U.S. PATENT DOCUMENTS

| 2003/0180582 A1* | 9/2003 | Masumoto et al. ................. 429/7 |
| 2007/0020509 A1* | 1/2007 | Kim .................................. 429/62 |

FOREIGN PATENT DOCUMENTS

| JP | 2002-373631 A | 12/2002 |
| JP | 2003-77436 A | 3/2003 |
| JP | 2005-183176 A | 7/2005 |
| JP | 2009-135033 A | 6/2009 |

OTHER PUBLICATIONS

Japanese Office Action dated Dec. 17, 2013 for Japanese Application No. 2010-285490 with English translation.

* cited by examiner

*Primary Examiner* — Patrick Ryan
*Assistant Examiner* — Wyatt McConnell
(74) *Attorney, Agent, or Firm* — Birch, Stewart, Kolasch & Birch, LLP

(57) ABSTRACT

A sealed battery includes: a columnar battery case encapsulating a chargeable/dischargeable electrode assembly and electrolyte in an interior and having a vent that cleaves up when a pressure in the interior exceeds a threshold; a cover that covers at least a portion of an outer surface of the vent of the battery case to prevent the vent from being covered with resin which is formed on the battery case; and a temperature protection device electrically connected with a terminal of the battery case and capable of blocking electric current when a temperature exceeds a threshold. The cover includes an overhang located to cover at least a portion of the temperature protection device when the temperature protection device is mounted on the cover. The temperature protection device is at least partially covered with the overhang and, together with the cover, covered with the resin.

5 Claims, 4 Drawing Sheets

SEALED BATTERY

TECHNICAL FIELD

The present invention relates to a sealed battery in which a temperature protection device is embedded in resin to prevent abnormal temperature increase.

BACKGROUND

Conventionally, sealed batteries in which a temperature protection device is embedded in resin to prevent abnormal temperature increase are known. In such a sealed battery, as disclosed in JP2002-373631A, for example, a circuit part for controlling charge/discharge and a temperature protection device for preventing excess current or thermal runaway, known as a positive temperature coefficient (PTC) device, are located outside the battery case (housing). JP2002-373631A also discloses an arrangement in which resin covers the circuit part and temperature protection device as well as part of the outer surface of the battery case to improve waterproof properties of the battery.

Generally, a temperature protection device is configured to change its physicality to have a larger resistance as the temperature increases in order to minimize current flowing through it. Accordingly, a temperature protection device has a predetermined maximum rated temperature. When the temperature of the temperature protection device exceeds the maximum rated temperature, the physicality of the temperature protection device changes to lose initial properties of the temperature protection device. Thus, if the temperature protection device comes in direct contact with resin melted during heating, properties of the temperature protection device change, such that expected properties may fail.

To solve this problem, JP2002-373631A discloses an arrangement in which the temperature protection device is covered with a sheet of heat-resistant rubber before the temperature protection device and the heat-resistant rubber are sealed in the resin. Thus, heat of the melted resin is not transmitted directly to the temperature protection device, thereby preventing properties originally possessed by the temperature protection device from being lost due to heat from the resin.

JP2009-135033A discloses an arrangement in which a holder forming a resin invasion prevention chamber is attached to the outside of the battery case such that the temperature protection device does not come in direct contact with melted resin.

SUMMARY

While the arrangement disclosed in JP2002-373631A protects the temperature protection device from heat from resin by means of a sheet of heat-resistant rubber, it requires an additional step of attaching a sheet of heat-resistant rubber onto the battery case to cover the temperature protection device. This increases the number of steps for producing a battery and, since it requires heat-resistant rubber, increases costs for manufacturing a battery.

As in the arrangement disclosed in JP2009-135033A, the temperature protection device may be completely encapsulated in a cover such that the temperature protection device is located in a closed space. However, any gap between the cover and the battery case may allow resin to seep into the closed space such that the temperature protection device may come into contact with hot resin. Thus, the arrangement disclosed in JP2009-135033A requires the cover to be formed with high size precision to prevent a gap between the cover and the battery case from being formed. Further, when the cover is attached to the battery case, the above arrangement requires high-precision assembly to prevent a gap between the cover and the battery case from being formed, which means a low workability.

In view of the above, an object of the present invention is to realize, in a simple and low-cost manner, a sealed battery in which a temperature protection device is embedded in resin to prevent abnormal temperature increase where the temperature protection device may be protected from heat from resin generated when the resin is formed.

A sealed battery according to an embodiment of the present invention includes: a columnar battery case encapsulating a chargeable/dischargeable electrode assembly and electrolyte in an interior and having a vent that cleaves up when a pressure in the interior exceeds a threshold; a cover that covers at least a portion of an outer surface of the vent of the battery case to prevent the vent from being covered with resin which is formed on the battery case; and a temperature protection device electrically connected with a terminal of the battery case and capable of blocking electric current when a temperature exceeds a threshold, wherein the cover includes an overhang located to cover at least a portion of the temperature protection device when the temperature protection device is mounted on the cover, and the temperature protection device is at least partially covered with the overhang and, together with the cover, covered with the resin (first arrangement).

In the above arrangement, an overhang provided on the cover covering the vent of the battery case covers at least a portion of the temperature protection device. This prevents properties of the temperature protection device from changing due to hot resin when the temperature protection device is sealed in resin. Moreover, since the overhang covering the temperature protection device is provided on the cover covering the vent of the battery case, no additional part for covering the temperature protection device needs to be provided, thereby reducing costs for manufacturing a battery.

Further, since the temperature protection device is covered with an overhang provided on the cover, the assembly is easier as it only requires the temperature protection device to be located relative to the overhang such that the overhang covers the temperature protection device. Specifically, the overhang is open in a portion in a cross section, making it easier to locate the temperature protection device relative to the overhang than with a cover closed in a cross section.

In addition, when resin is injection-molded, the overhang covering the temperature protection device can be easily deformed when it is pushed by the injection pressure toward the temperature protection device. Thus, the gap between the overhang and the temperature protection device becomes smaller, thereby reducing the amount of resin seeping around the temperature protection device.

In the first arrangement above, it is preferable that the overhang is L-shaped in a cross section to cover the temperature protection device from at least two directions (second arrangement).

Thus, the overhang is capable of covering the temperature protection device in a more reliable manner, and the overhang can be deformed more easily toward the temperature protection device during sealing with resin. Thus, resin is prevented from seeping around the temperature protection device in a more reliable manner, thereby preventing the temperature protection device from being affected by heat from the resin in a more reliable manner.

In the first arrangement above, it is preferable that the overhang includes a visor covering a side of the temperature protection device opposite a side thereof facing the battery case and a support that supports the visor and covers the temperature protection device from a side, and the visor has a low-rigidity portion with a rigidity lower than in another portion to allow the visor to be deformed toward the temperature protection device (third arrangement).

Thus, the overhang of the cover is deformed such that the visor is always positioned toward the temperature protection device and, when resin is formed, the visor is pushed by the resin such that it can be positioned more easily toward the temperature protection device. Thus, the gap between the visor of the overhang and the temperature protection device becomes even smaller, further preventing resin from getting around the temperature protection device. Consequently, the above arrangement prevents the temperature protection device from being affected by heat from the resin in a more reliable manner.

In the third arrangement above, it is preferable that the visor of the overhang is tabular, and the low-rigidity portion is constituted by a recess provided on a side of the visor opposite the side thereof facing the temperature protection device (fourth arrangement).

Thus, the visor of the overhang can be easily deformed toward the temperature protection device and, in addition, wires or the like can be disposed in the recess provided on the side of the visor opposite the side facing the temperature protection device. Thus, the temperature protection device can be protected from heat from resin in a more reliable manner, while lines or the like can be disposed in a smaller space, thereby reducing the size of the battery.

In the third arrangement, it is preferable that the temperature protection device is rectangular in a plan view; the visor of the overhang is rectangular in a plan view to correspond to the temperature protection device; and the support is provided on a long side of the visor in a plan view (fifth arrangement).

Thus, the temperature protection device, which is rectangular in a plan view, can be inserted through a long side of the overhang, thereby improving the workability in assembly of the temperature protection device. Moreover, the overhang which has a support on a long side can be significantly deformed on a long side without the support, such that a long side of the overhang comes close to the temperature protection device which is rectangular in a plan view. Accordingly, the gap between the temperature protection device and the overhang can be made smaller in a large area, thereby preventing resin from seeping around the temperature protection device in a more reliable manner.

In the first arrangement, it is preferable that a protection circuit and a connecting wire connecting the protection circuit with a side of the temperature protection device opposite the side thereof connected with a terminal of the battery case are further included, wherein the protection circuit is located above the cover, and the connecting wire is bent such that a portion thereof is located on the overhang of the cover (sixth arrangement).

Thus, the temperature protection device and the protection circuit can be arranged compactly above the cover. Thus, the size of the battery can be reduced.

Further, the above arrangement facilitates attaching the temperature protection device and the protection circuit to the cover. Specifically, with the side of the temperature protection device opposite the side connected with a terminal of the battery case being connected with the protection circuit, the temperature protection device is first disposed on the cover such that it is covered with the overhang. Then, the connecting wire for the temperature protection device and the protection circuit is bent such that a portion of the connecting wire is positioned on the overhang. Thus, the temperature protection device and the protection circuit can be compactly and easily arranged above the cover.

In the first arrangement, it is preferable that the overhang is formed integrally with the cover (seventh arrangement). Thus, the overhang can be easily formed. Moreover, since the overhang is integrally formed with the cover, the visor of the overhang can be easily inclined inward to reduce the gap between the visor and the temperature protection device, thereby preventing resin from seeping into the gap in a more reliable manner.

A method of manufacturing a sealed battery according to an embodiment of the present invention includes: a battery body manufacturing step for sealing a chargeable/dischargeable electrode assembly and electrolyte inside a columnar battery case; a cover preparation step for preparing a cover including an overhang that covers a temperature protection device and in which the temperature protection device can slide; a temperature protection device preparation step for connecting a protection circuit with one of two connecting wires connected with the temperature protection device; a cover attachment step for attaching the cover on the battery case; a temperature protection device attachment step for sliding the temperature protection device connected with the protection circuit toward the cover such that the device is covered with the overhang; a terminal connection step for connecting the other connecting wire connected with the temperature protection device to a terminal of the battery case; a lead wire bending step for bending the one connecting wire connecting the protection circuit with the temperature protection device such that the protection circuit is located above the cover; and a resin forming step for forming resin on the battery case such that the resin covers the temperature protection device, an inner frame and the protection circuit (eighth method).

In the above method, a temperature protection device can be easily positioned relative to the overhang by sliding the temperature protection device toward the overhang of the cover. Moreover, since the temperature protection device to which a protection circuit is attached via a connecting wire is attached to the overhang of the cover, the protection circuit can be easily attached to the cover by bending the connecting wire. Thus, a temperature protection device and a protection circuit can be easily attached to the cover.

In a sealed battery according to an embodiment of the present invention, an overhang is provided on the cover to cover at least a portion of the temperature protection device, thereby preventing resin from seeping around the temperature protection device. This will prevent properties of the temperature protection device from changing due to heat from hot resin, thereby ensuring specific functions of the temperature protection device. This will realize an arrangement in which the temperature protection device can be protected from heat of resin during resin formation in a simple and low-cost manner.

DETAILED DESCRIPTION

Now, an embodiment of the present invention will be described in detail with reference to the drawings. The same or corresponding components throughout the drawings are labeled with the same numerals, and their description will not be repeated.

Overall Arrangement

Figure 1:
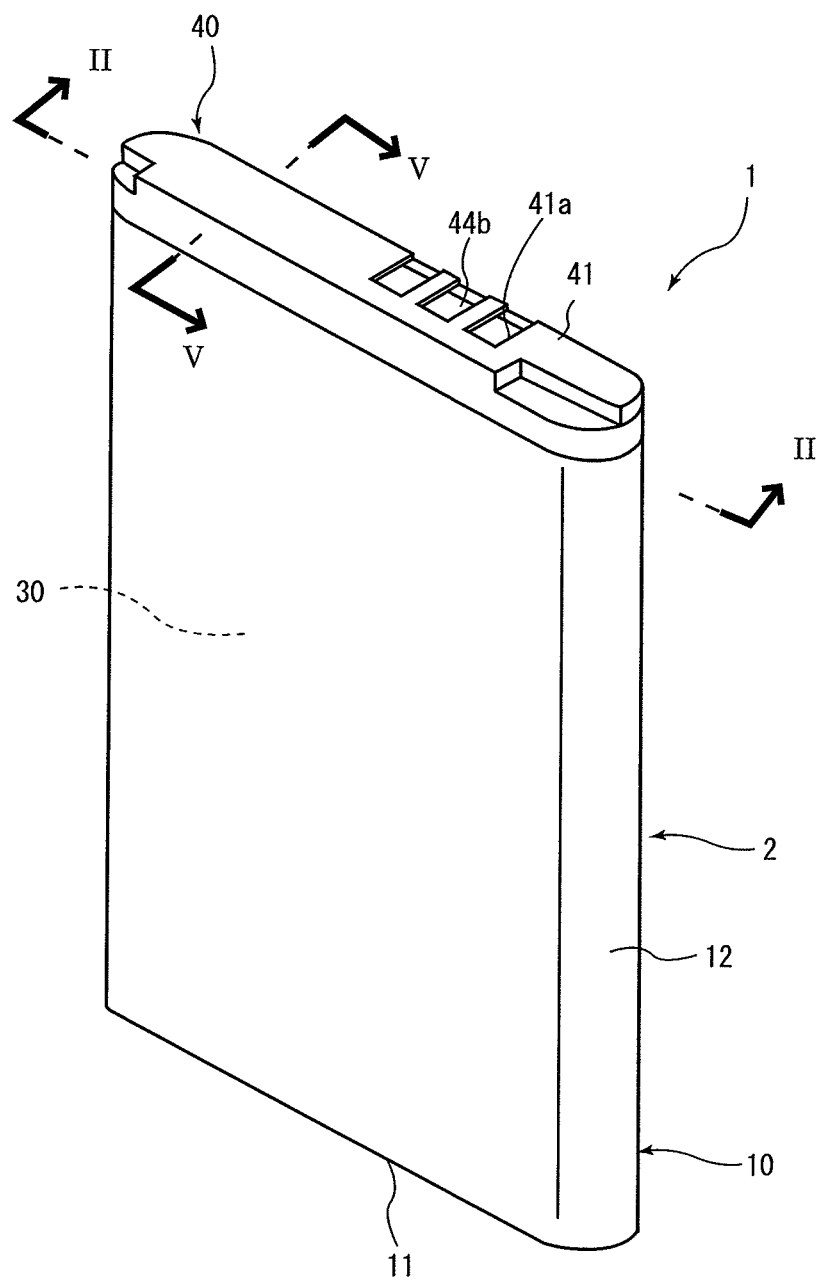
FIG. 1 is a schematic perspective view of a sealed battery according to an embodiment of the present invention.
Figure 2:
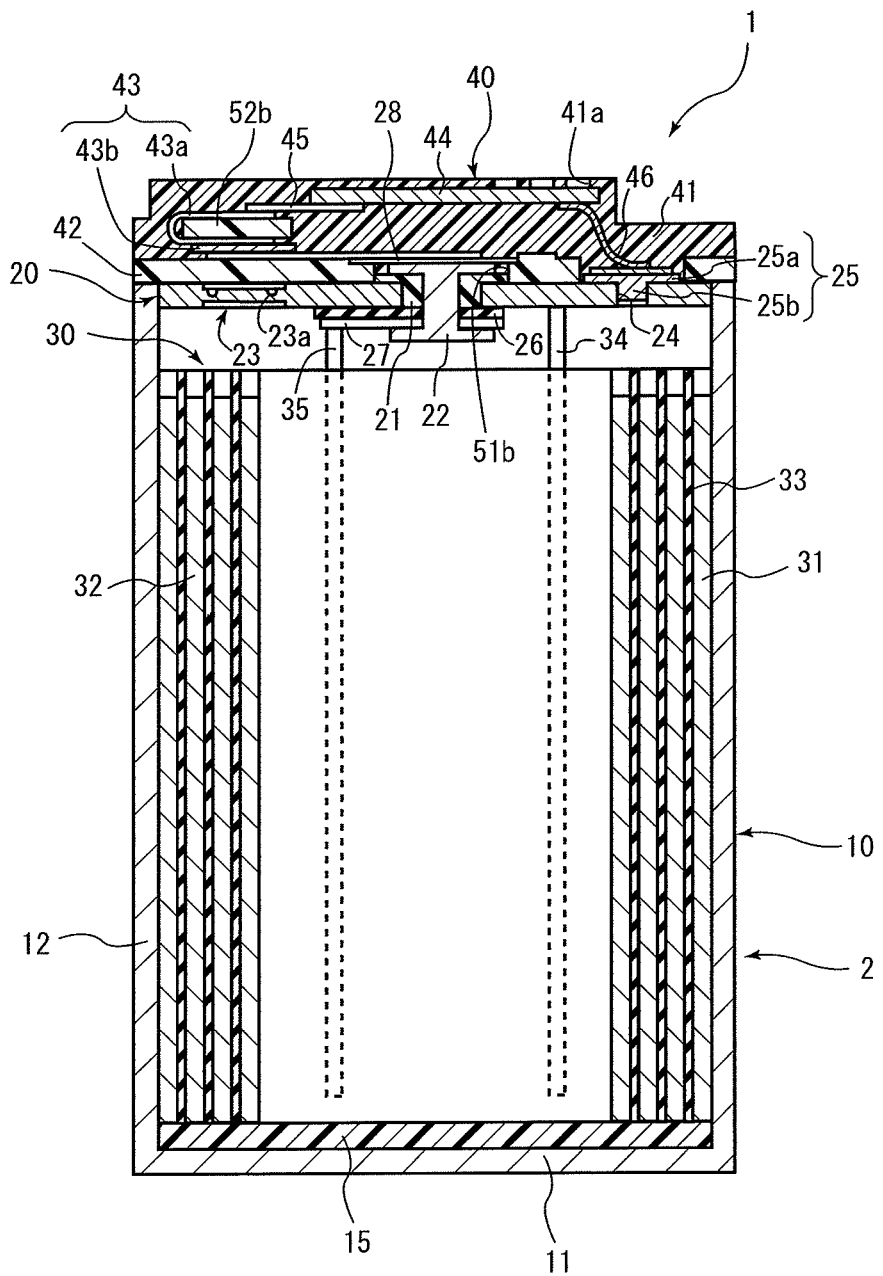
FIG. 2 is a cross sectional view taken along line II-II of FIG. 1.

FIG. 1 is a schematic perspective view of a sealed battery 1 according to an embodiment of the present invention. FIG. 2 is a cross sectional view taken along line II-II of FIG. 1. As shown in FIGS. 1 and 2, the sealed battery 1 includes: an exterior can 10 in the form of a cylinder with a bottom; a cap 20 that covers the opening of the exterior can 10; and an electrode assembly 30 contained in the exterior can 10. The exterior can 10 together with the attached cap 20 forms a hollow cylindrical battery case 2. It should be noted that, in addition to the electrode assembly 30, non-aqueous electrolyte (hereinafter referred to as "electrolyte"), is enclosed in the battery case 2.

As shown in FIG. 2, the electrode assembly 30 is a jellyroll electrode assembly formed of a stacked and spirally wound sheet-shaped positive electrode 31 and negative electrode 32, where a separator 33 is placed between the two electrodes, for example, as shown in FIG. 2. The positive electrode 31, negative electrode 32 and separator 33 are all stacked upon one another and spirally wound before being pressed to form a flattened electrode assembly 30.

FIG. 2 only shows a few outer layers of the electrode assembly 30. An illustration of an inner portion of the electrode assembly 30 is omitted in FIG. 2; of course, the positive electrode 31, negative electrode 32 and separator 33 exist in the inner portion of the electrode assembly 30. Also, an illustration of an insulator or the like located in the region on and near the back side of the cap 20 is omitted in FIG. 2.

The positive electrode 31 includes a positive electrode active material layer containing positive electrode active material provided on both sides of a positive current collector made of metal foil, such as aluminum foil. Specifically, the positive electrode 31 is fabricated by applying a positive electrode mixture containing a positive electrode active material, a conductive aid, a binder and the like to the positive current collector of aluminum foil or the like, the positive electrode active material being a lithium-containing oxide that can occlude and discharge lithium ions, and drying the applied materials. Preferably, lithium-containing oxides used as a positive electrode active material may include, for example, a lithium cobalt oxide such as $LiCoO_2$, a lithium manganese oxide such as $LiMn_2O_4$, or a lithium composite oxide including a lithium nickel oxide, such as $LiNiO_2$. It should be noted that just one positive electrode active material may be used, or two or more materials may be combined. Moreover, the positive electrode active materials are not limited to those mentioned above.

The negative electrode 32 includes a negative electrode active material layer containing negative electrode active material provided on both sides of a negative current collector made of metal foil, such as copper foil. Specifically, the negative electrode 32 is fabricated by applying a negative electrode mixture containing a negative electrode active material, a conductive aid, a binder and the like to the negative current collector of copper foil or the like, the negative electrode active material being capable of occluding and discharging lithium ions, and drying the applied materials. Preferably, negative electrode active materials may include, for example, a carbon material that is capable of occluding and discharging lithium ions (graphites, pyrolytic carbons, cokes, glass-like carbons or the like). The negative electrode active materials are not limited to those mentioned above.

The positive electrode 31 of the electrode assembly 30 is connected with a positive lead 34, while the negative electrode 32 is connected with a negative lead 35. The positive and negative leads 34 and 35 extend to the outside of the electrode assembly 30. An end of the positive lead 34 is connected to the cap 20. An end of the negative lead 35 is connected to the negative terminal 22 via a lead plate 27, as described later.

The exterior can 10 is in the form of a cylinder with a bottom made of an aluminum alloy and, together with the cap 20, forms the battery case 2. As shown in FIGS. 1 and 2, the exterior can 10 is in the form of a cylinder with a bottom having a rectangular bottom 11 with arc-like short sides. More specifically, the exterior can 10 includes a bottom 11 and a flattened and cylindrical side wall 12 having a smooth and rounded surface. That is, the exterior can 10 is in a flattened shape where the thickness, which corresponds to the dimension of the short sides of the bottom 11, is smaller than the width, which corresponds to the dimension of the long sides of the bottom 11 (for example, the thickness may be about one tenth of the width). Moreover, the exterior can 10 is joined to the cap 20 which is in turn connected to the positive lead 34, as described later.

As shown in FIG. 2, on the inside of the bottom of the exterior can 10 is placed an insulator 15 made of a polyethylene sheet for preventing a short circuit between the positive electrode 31 and the negative electrode 32 of the electrode assembly 30 via the exterior can 10. The electrode assembly 30 described above is positioned in such a way that one of its ends is on the insulator 15.

The cap 20 is joined to the opening of the exterior can 10 with welding to cover the opening of the exterior can 10. The cap 20 is made of an aluminum alloy, similar to the exterior can 10, and has arc-like short sides of the rectangle such that it can fit with the inside of the opening of the exterior can 10. Further, the cap 20 has a through-hole in the center in its longitudinal direction. Through this through-hole pass an insulating packing 21 made of polypropylene and a negative terminal 22 made of stainless steel. Specifically, a generally cylindrical insulating packing 21 penetrated by a generally cylindrical negative terminal 22 fits with the periphery of the through-hole. The negative terminal 22 has flat portions integrally formed with the respective ends of the cylindrical axle. The negative terminal 22 is positioned relative to the insulating packing 21 such that a flat portion is exposed to the outside while the axle is inside the insulating packing 21. The end of the negative terminal 22 inside the battery is connected with a lead plate 27 made of stainless steel. Thus, the negative terminal 22 is electrically connected with the negative electrode 32 of the electrode assembly 30 via the lead plate 27 and the negative lead 35. An insulator 26 is placed between the lead plate 27 and the insulating packing 21. Further, a tabular negative electrode plate 28 is welded to the end of the negative terminal 22 outside the battery, as described later.

A fill port 24 for electrolyte is formed on the cap 20 next to the negative terminal 22. The fill port 24 is generally in the form of a circle in a plan view. The fill port 24 is sealed with a seal plug 25. The seal plug 25 includes a flat portion 25a made of two plates of different metal materials stacked upon each other in the thickness direction and joined together, and a columnar portion 25b that protrudes generally in the form of a cylinder from one side of the flat portion. Specifically, if the flat portion 25a is composed of a clad material made of an upper nickel layer and a lower aluminum layer, for example, the seal plug 25 has a columnar portion 25b integrally formed with the surface of the aluminum alloy of the flat portion. The outer perimeter of the flat portion 25a of the seal plug 25 is laser-welded to the cap 20, where the columnar portion 25b is positioned inside the fill port 24 of the cap 20, as shown in FIG. 2. Thus, the upper nickel layer of the flat portion 25a of the seal plug 25 is exposed. One end of the positive lead wire 46 made of nickel is welded to the upper surface of the flat portion 25a of the seal plug 25. The other end of the positive lead wire 46 is connected with a protection circuit 44, described later.

Further, a cleaving groove 23a constituting a vent 23 is formed in the cap 20, as shown in FIG. 2. The cleaving groove 23a is configured to cleave up when the pressure inside the battery case 2 exceeds a threshold. When the cleaving groove 23a cleaves up, gases inside the battery case 2 are released to the outside to prevent the pressure in the battery case 2 from increasing above the threshold.

A seal member 40 formed of resin 41 is provided above the outer surface of the cap 20 (the upper surface in FIG. 2) and above the opening end of the side wall 12 of the cap 10. Providing the seal member 40 allows the resin 41 to seal the outer surface of the cap 20 and the opening end of the side wall 12 of the exterior can 10. The resin 41 is composed of a polyamide-based hot-melt resin, for example.

In addition to the resin 41, the seal member 40 includes: an inner frame 42 (cover) covering a portion of the outer surface of the cap 20 such that, when the resin 41 is injection-molded, no melted resin adheres to the vent 23; a PTC device 43 that blocks current at a predetermined temperature or above; and a protection circuit 44 for preventing overcharge or overdischarge of the sealed battery 1. Specifically, as shown in FIG. 2, the seal member 40 is formed by attaching an inner frame 42 to the cap 20 and disposing the PTC device 43 and the protection circuit 44 on the inner frame 42 before sealing them with the resin 41. The detailed structure, such as shape, of the inner frame 42 will be described later.

Figure 5:
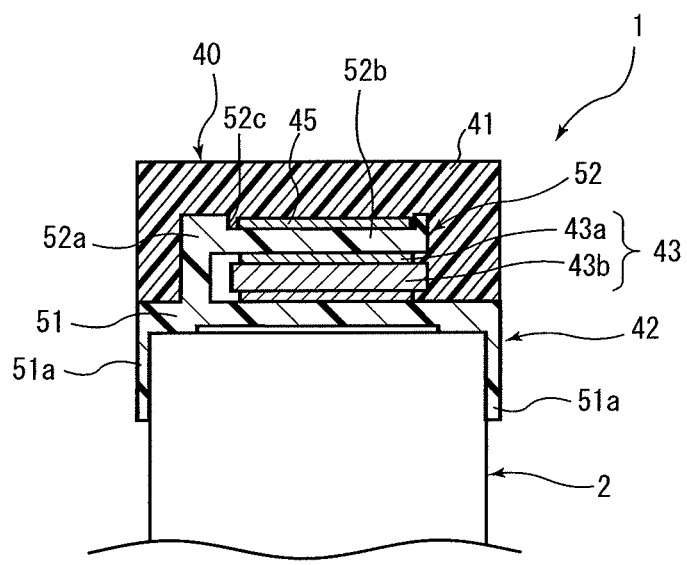
FIG. 5 is a cross sectional view of the battery taken along line V-V of FIG. 1.
Figure 6:
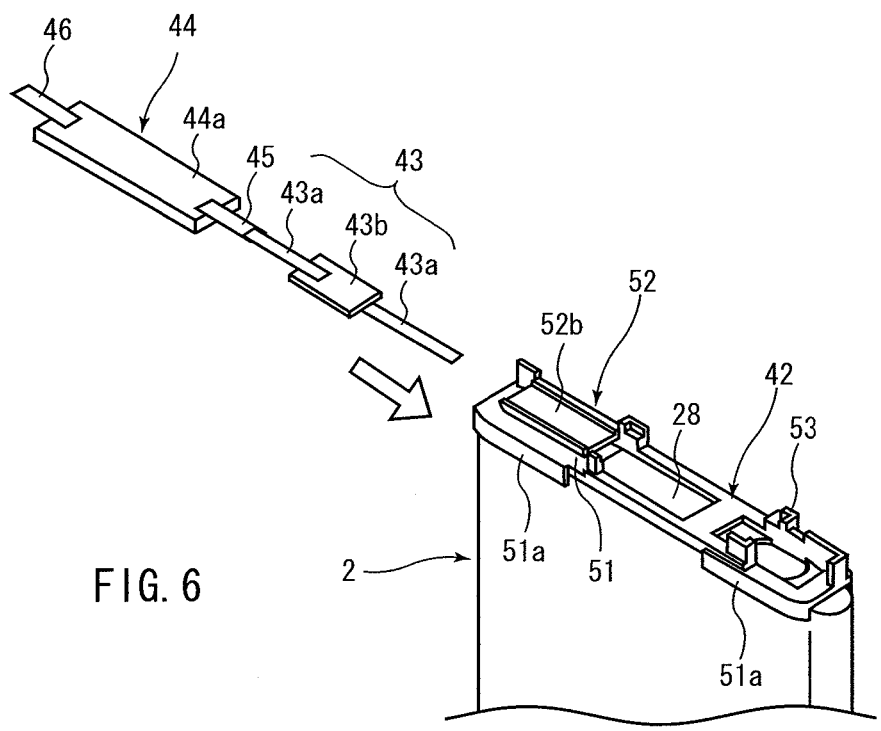
FIG. 6 is a perspective view of an inner frame attached to the battery case where a PTC device and a protection circuit are being inserted.

As shown in FIGS. 5 and 6, the PTC device 43 has, for example, two conductive metal plates 43a sandwiching a polymer member 43b (temperature protection device) made of a conductive polymer composition. The polymer member 43b has a low resistance as conductive particles dispersed in the polymer form innumerable conductive paths at normal temperature. When temperature rises from normal temperature, the rate of thermal expansion of the polymer of the polymer member 43b is larger than that of the conductive particles, such that the conductive paths are cut off as temperature rises, and resistance gradually increases. Then, when temperature exceeds a threshold (for example, 80 degrees centigrade), the resistance of the polymer member 43b rises rapidly and blocks current that flows into the sealed battery 1.

In the present embodiment, the polymer member 43b of the PTC device 43 is generally in the form of a rectangular in a plan view. The conductive metal plates 43a are fixed to, and connected with, different faces of the polymer member 43b on the different ends, in the longitudinal direction, of the generally rectangular polymer member 43b. Out of the two conductive metal plates 43a connected to the polymer member 43b of the PTC device 43, one conductive metal plate 43a is connected with the negative terminal 22 of the sealed battery 1. The other conductive metal plate 43a is connected with the protection circuit 44 via the negative lead wire 45, as described later. This conductive metal plate 43a and the negative lead 45 constitute the connecting wire of the present invention.

Figure 4:
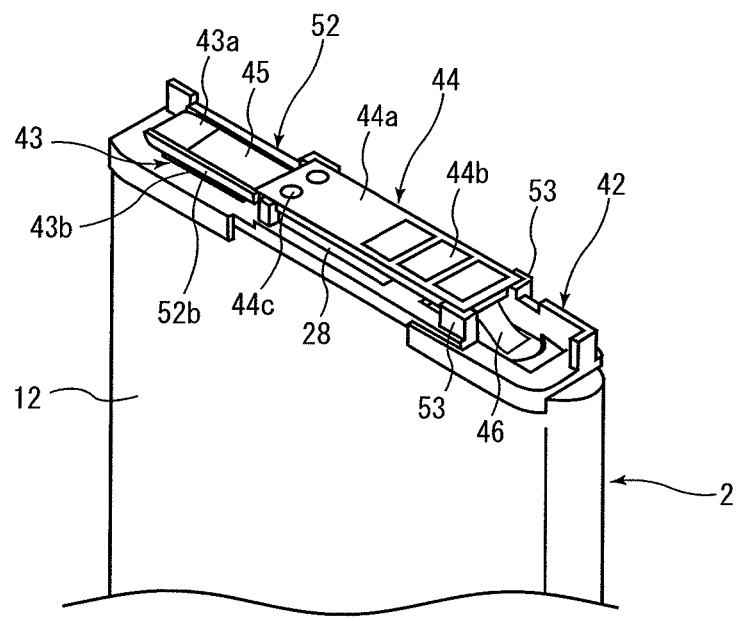
FIG. 4 is a perspective view of an inner frame with a PTC device and a protection circuit attached thereto.

The protection circuit 44 prevents overcharge and overdischarge of the battery 1 and, as shown in FIGS. 4 and 5, is fabricated by mounting an IC or the like, not shown, on a substrate 44a made of a resin and generally rectangular in a plan view. Terminal portions 44b that serve as external terminals to be in contact with terminals of equipment are formed on one side of the substrate 44a of the protection circuit 44. An opening 41a is formed in the resin 41 of the seal member 40 for exposing the terminal portions 44b formed on the substrate 44a of the protection circuit 44 (see FIGS. 1 and 2). The positive lead wire 46 connected with the cap 20 and the negative lead wire 45 are electrically connected with the substrate 44a of the protection circuit 44. Thus, one (or some) of the terminal portions 44b serves as a positive terminal and other(s) serves as a negative terminal.

As discussed above, the protection circuit 44 is connected with a conductive metal plate 43a of the PTC device 43 via the negative lead wire 45, as shown in FIGS. 2, 4 and 6. That is, since a current flows to the protection circuit 44 via the PTC device 43, no current flows into the protection circuit 44 when the PTC device 43 blocks current at an increased temperature, such that no current flows into the terminal portions 44b on the substrate 44a of the protection circuit 44. Thus, the arrangement above allows the PTC device 43 to block current that flows toward the equipment.

Two test terminals 44c are provided on the substrate 44a of the protection circuit 44 for use in conductivity tests of the sealed battery 1 before the product is shipped. One of the test terminals 44c serves as a positive terminal, while the other one serves as a negative terminal.

The PTC device 43 and the protection circuit 44, mounted on the inner frame 42 on the cap 2 of the sealed battery 1, are sealed with resin 41. The PTC device 43 and the protection circuit 44 are disposed on the inner frame 42 in two levels, as shown in FIGS. 2 and 4.

Structure of Inner Frame

Next, the structure of the inner frame 42 is described in detail with reference to the FIGS. 3 to 5.

Figure 3:
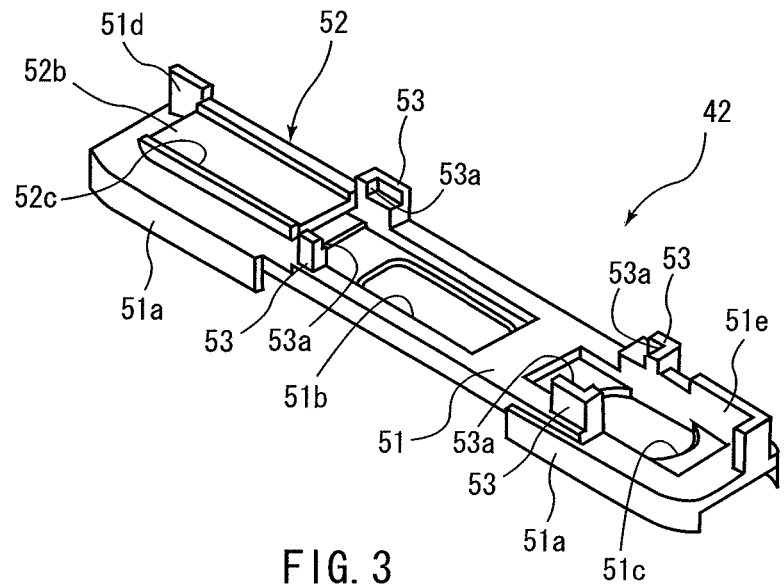
FIG. 3 is a schematic perspective view of an inner frame.

As shown in FIG. 3, the inner frame 42 is composed of a tabular member that is generally rectangular in a plan view. Specifically, the inner frame 42 has a geometry conforming with the end of the battery case 2 such that it can be disposed on the end of the battery case 2 to which the cap 20 is attached (see FIG. 4, for example). In other words, the inner frame 42 has rounded corners of the rectangle in a plan view. As shown in FIG. 4, the inner frame 42 has a length in the longitudinal direction smaller than the length of the end of the battery case 2 in the longitudinal direction. Thus, when the inner frame 42 is mounted on the end of the battery case 2, the shorter sides of the end of the battery case 2 (i.e. the two ends in the longitudinal direction) are exposed.

More specifically, as shown in FIG. 3, the inner frame 42 includes: a tabular base 51; an overhang 52 covering the PTC device 43 on the base 51; and four holders 53 to hold the substrate 44a of the protection circuit 44 higher than the PTC device 43 on the base 51. The base 51, the overhang 52 and the holders 53 are integrally formed of a resin such as polycarbonate using a mold.

The base 51 has projections 51a along its outer periphery extending in the thickness direction of the base 51, toward the side opposite the side having the overhang 52 and the holders 53. Specifically, the projections 51a extend along the side wall 12 of the battery case 2 when the inner frame 42 is mounted on the end of the battery case 2. A total of four projections 51a are provided at the ends, in the longitudinal direction, of the long sides of the base 51 which is generally rectangular in a plan view. The projections 51a help position the inner frame 42 with respect to the end of the battery case 2 and prevent misalignment of the inner frame 42. Accordingly, the inner frame 42 can be disposed on the end of the battery case 2 in a more stable and precise manner.

The base 51 has a generally rectangular through-hole 51b in the middle in the longitudinal direction. The through-hole 51b is provided such that the negative terminal 22 of the sealed battery 1 can extend through it when the inner frame 42 is disposed on the end of the battery case 2. As shown in FIG. 2, a tabular negative electrode plate 28 is welded to the top of the negative terminal 22 that has passed through the through-hole 51b of the inner frame 42.

Further, as shown in FIG. 3, the base 51 has a through-hole 51c that corresponds to the fill port 24 on the cap 20, as well as ribs 51d and 51e for reinforcement. In the present embodiment, the rib 51e is formed integrally with one of the four holders 53.

Four holders 53 are provided in the middle of the inner frame 42 in the longitudinal direction to surround the through-hole 51b of the inner frame 42 so as to hold the substrate 44a of the protection circuit 44. On the base 51 of the inner frame 42, the holders 53 are formed integrally with the base 51 in the locations corresponding to the four corners of the substrate 44a so as to hold the substrate 44a of the protection circuit 44, which is generally rectangular in a plan view, at its four corners. Further, each of the holders 53 is in the form of a column and has a recess 53a, with which one of the four corners of the substrate 44a of the protection circuit 44 engages, at its projecting end. Providing holders 53 of such a structure on the inner frame 42 allows the substrate 44a of the protection circuit 44 to be disposed in a predetermined position without misalignment.

The overhang 52 is formed integrally with the inner frame 42 such that it is located above the vent 23 on the cap 20 of the battery case 2 when the inner frame 42 is attached to the battery case 2. That is, the overhang 52 is formed integrally with the base 51 toward one side, in the longitudinal direction, of the through-hole 51b of the base 51.

The overhang 52 is generally in the form of a rectangle in a plan view such that it has the same longitudinal direction as the substrate 44a of the protection circuit 44 held by the holders 53. Further, the overhang 52 is provided such that one end thereof in the longitudinal direction is close to one end of the substrate 44a in the longitudinal direction. Thus, as shown in FIG. 4, the lead wire 45 connected with the substrate 44a of the protection circuit 44 can be disposed on a visor 52b, described later, of the overhang 51. Thus, the conductive metal plate 43a of the PTC device 43 connected with the negative lead wire 45 can be disposed on the visor 52b, and the lead wire 45 and the conductive metal plate 43a extending from the substrate 44a of the protection circuit 44 to the PTC device 43 provided below the visor 52b can be disposed along the visor 52b. Thus, the PTC device 43 and the protection circuit 44 can be compactly arranged above the inner frame 42.

As shown in FIG. 5 in a cross section, the overhang 52 includes a support 52a formed integrally with the base 51 and a visor 52b extending generally parallel to the base 51 from the support 52a. The support 52a and the visor 52b are integrally formed of resin to form the overhang 52.

The overhang 52 is configured to cover the polymer member 43b of the PTC device 43. Specifically, the support 52a of the overhang 52 has a height that enables positioning the visor 52b higher than the combined thickness of the conductive metal plates 43a of the PTC device 43 and the polymer member 43b and, when the resin 41 is injection-molded, preventing melted resin from coming into the gap between the visor and the PTC device 43. For example, the height of the support 52a is set such that the gap between the visor 52b and the PTC device 43 is less than 0.1 millimeters wide. The visor 52b of the overhang 52 is generally in the form of a rectangle in a plan view which is large enough to cover the polymer member 43b of the PTC device 43.

The visor 52b has a recess 52c (low-rigidity portion) on the side opposite the side on which the PTC device 43 is disposed (the upper surface in FIG. 5). The recess 52c is formed in the middle, in the width direction, of the visor 52b which is generally rectangle in a plan view, extending from one end of the visor 52b in the longitudinal direction to the other end. The recess 52c is large enough to allow a conductive metal plate 43a of the PTC device 43 and the lead wire 45 to be disposed therein.

By means of the above structure, when the resin 41 of the seal member 40 is injection-molded, melted resin is prevented from coming in between the PTC device 43 and the overhang 52. Moreover, the projecting end of the visor 52b of the overhang 52 can be easily deformed toward the PTC device 43 (downward in FIG. 5), such that the visor 52b can be pressed against the PTC device 43 due to pressure generated when the resin 41 is injection-molded. This will reduce the gap between the visor 52b and the PTC device 43, thereby preventing melted resin from seeping between the visor 52b and the PTC device 43.

In the above structure, the support 52a is provided on a long side of the visor 52b which is rectangular in a plan view, and the long side edge of the visor 52b opposite that with the support 52a provides the projecting end. Thus, when the visor 52b is deformed, the projecting end at a long side comes close to the PTC device 43, such that the gap between the visor 52b and the PTC device 43 becomes smaller across a large area. Thus, resin can be prevented from seeping into the gap between the visor 52b and the PTC device 43 across a large area.

Further, providing a recess 52c as described above on the visor 52b of the overhang 52 reduces the rigidity of the visor 52b in some areas, such that the visor 52b can be deformed more easily toward the PTC device 43 when the resin 41 is injection-molded.

In addition, a negative lead wire 45 connected with the substrate 44a of the protection circuit 44 can be disposed in the recess 52c in the visor 52b, such that the lead wire 45 and a conductive metal plate 43a of the PTC device 43 can be wound around the visor 52b. Thus, the PTC device 43 and the protection circuit 44 can be disposed in two levels, top and bottom, above the inner frame 42 and can be arranged compactly. Thus, the size of the sealed battery 1 can be reduced.

Using an overhang 52 of the above structure to cover the PTC device 43 allows sliding the PTC device 43 from the projecting end of the visor 52b of the overhang 52 to a predetermined position (shown in FIG. 5). Thus, the PTC device 43 can be easily disposed on the base 51 of the inner frame 42.

Further, using such an overhang 52 to cover the PTC device 43 makes it easier to remove the mold after the overhang 52 is molded than using resin covering the PTC device in a surrounding manner. This facilitates forming the inner frame 42 using a mold. Moreover, the visor 52b of the overhang 52 formed using a mold is inclined toward the PTC device 43, thereby reducing the gap between the visor 52b and the PTC device 43.

Method of Manufacturing Sealed Battery

Next, a method of manufacturing a sealed battery 1 having a structure as described above will be described with reference to FIGS. 1, 4 and 6.

First, although not shown, an electrode assembly 30 and electrolyte are placed in an exterior can 10 of the battery case 2, which is then tightly sealed with a cap 20. Meanwhile, an inner frame 42 is integrally formed of a resin such as polycarbonate.

Next, as shown in FIG. 6, the inner frame 42 is attached to the end of the battery case 2. The inner frame 42 is attached to the battery case 2 in such a way that the projections 51a of the base 51 of the inner frame 42 are positioned on the outer surface of the battery case 2. Then, a tabular negative electrode plate 28 is welded to the negative terminal 22.

Meanwhile, a substrate 44a of a protection circuit 44 is connected to a conductive metal plate 43a of a PTC device 43 via a negative lead wire 45. Also, a positive lead wire 46 is connected to the substrate 44a of the protection circuit 44 on the end opposite the end connected with the negative lead wire 45. Thus, as shown in FIG. 6 to the left, a member having a PTC device 43 and a protection circuit 44 connected in series is provided.

Then, the above member having a PTC device 43 and a protection circuit 44 connected in series is slid in the longitudinal direction of the battery case 2 (along the outlined arrow in FIG. 6) to the overhang 52 of the inner frame 42, so as to be inserted between the base 51 and the visor 52b. At this moment, the PTC device 43 is slid along until the end of the conductive metal plate 43a that is not connected with the lead wire 45 of the PTC device 43 is positioned above the negative electrode plate 28. It should be noted that the PTC device 43 may be slid into the overhang 52 obliquely toward the long side of the battery case 2, i.e. the PTC device 43 being at an angle relative to the overhang 52, instead of in the longitudinal direction of the battery case 2.

After one of the conductive metal plates 43a of the PTC 43 is slid to above the negative electrode plate 28, the tip of this conductive metal plate 43a is welded to the negative electrode plate 28. Thereafter, the conductive metal plate 43a connected with the negative lead wire 45 is bent in the thickness direction such that the lead wire 45 is positioned in the recess 52c of the visor 52b of the overhang 52, as shown in FIG. 4. The conductive metal plate 43a is bent in such a way that the four corners of the substrate 44a of the protection circuit 44 are held by the holders 53 of the inner frame 42. Then, as the positive lead 46 is connected with the substrate 44a of the protection circuit 44 at one end, the other end thereof is welded to the flat portion 25a of the seal plug 25 covering the fill port 24 of the cap 20. The PTC device 43 and the protection circuit 44 being disposed on the inner frame 42 are shown in FIG. 4.

Subsequently, as shown in FIGS. 1 and 2, the inner frame 42, together with the PTC device 43 and the protection circuit 44, is sealed with resin 41 made of, for example, a polyamide-based hot-melt resin. The resin 41 is formed using injection molding. When the resin 41 is injection-molded, the visor 52b of the overhang 52 of the inner frame 42 is pushed toward the PTC device 43. Thus, the gap between the visor 52b and the PTC device 43 becomes smaller, thereby preventing resin from seeping into the gap. Moreover, as discussed above, the visor 52b has a recess 52c on the side opposite the side facing the PTC device 43 and thus has a lower rigidity in that area, such that the visor 52b can be deformed more easily toward the PTC device 43 when the resin 41 is injection-molded. Thus, the gap between the visor 52b of the overhang 52 and the PTC device 43 becomes smaller still, thereby preventing resin from seeping into the gap in a more reliable manner.

During sealing with the resin 41, pins are pressed onto the terminal portions 44b and the test terminals 44c on the substrate 44a of the protection circuit 44 to position the substrate 44a. Pressing the pins onto the terminal portions 44b and the test terminals 44c on the substrate 44a also prevents the terminal portions 44b and the test terminals 44c from being covered with melted resin. Thus, openings 41a that expose the terminal portions 44b (see FIGS. 1 and 2) and openings that expose the test terminals 44c (not shown) are formed in the resin 41. The openings that expose the test terminals 44c are covered with a sticker or the like in FIG. 1.

The step of sealing the electrode assembly 30 and electrolyte inside the battery case 2 to form the battery body corresponds to the battery body manufacturing step. The step of forming the inner frame 42 corresponds to the cover preparation step, while the step of connecting the lead wire 45 connected with the substrate 44a of the protection circuit 44 to a conductive metal plate 43a of the PTC device 43 corresponds to the temperature protection device preparation step. Further, the step of attaching the inner frame 42 to the battery case 2 corresponds to the cover attachment step, while the step of sliding the PTC device 43 to a predetermined position relative to the overhang 52 of the inner frame 42 corresponds to the temperature protection device attachment step. The step of connecting the end of a conductive metal plate 43a of the PTC device 43 to the negative electrode plate 28 corresponds to the terminal connection step; the step of bending a conductive metal plate 43a such that the protection circuit 44 is held by the holders 53 of the inner frame 42 corresponds to the lead wire bending step; and the step of injection-molding resin 41 corresponds to the resin forming step.

Verification Tests

Next, differences in preventing resin from seeping into the gap between the PTC device and the inner frame between an implementation where the overhang 52 covers the PTC device 43 in the above manner and an implementation where the PTC device is surrounded on four sides (i.e. the part covering the PTC device is in the form of a rectangular column as viewed from a long side of the inner frame) will be described.

Properties of the PTC device are changed by the effects of heat from resin seeping into the gap between the PTC device and the inner frame. The larger amount of resin coming in contact with the PTC device, to the greater degree properties of the PTC device are changed; accordingly, the degree of change in resistance of the PTC device during the resin formation was measured.

In the implementation with the PTC device surrounded on four sides, resin formation caused the resistance of the PTC device to increase by around 6 to 7 mΩ, where the initial resistance is 40 mΩ. On the other hand, in the implementation with the PTC device 43 covered with the overhang 52 described above, resin formation caused the resistance of the PTC device to increase by around 5 mΩ. That is, the implementation with the PTC device surrounded on four sides had a resistance increase of about 20% larger than in the arrangement of the present embodiment. This is because, as discussed above, the arrangement of the present embodiment has a structure of the visor 52b of the overhang 52 that allows it to be deformed toward the PTC device 43 to reduce the gap between the PTC device 43 and the visor 52b, thereby preventing melted resin from seeping into the gap.

Therefore, the arrangement of the present embodiment prevents resin from seeping into the gap between the PTC device and the inner frame in a more reliable manner than in an implementation where the PTC device is surrounded on four sides, thereby reducing the effects of heat from resin on the PTC device.

Effects of Embodiment

As described above, the present embodiment provides an overhang 52 covering the polymer member 43b of the PTC device 43 on the inner frame 42 attached to the end of the battery case 2, such that the visor 52b of the overhang 52 is deformed when resin 41 is injection-molded, thereby reducing the gap between the visor 52b and the PTC device 43. This prevents resin melted when resin 41 is injection-molded from seeping into the gap.

Moreover, the visor 52b of the overhang 52 has a recess 52c on the side opposite the side facing the PTC device 43, such that the visor 53b can be easily deformed toward the PTC device 43, thereby further reducing the gap between the visor 52b and the PTC device 43 when the resin 41 is injection-molded.

Further, the polymer member 43b of the PTC device 43 is covered with the overhang 52 to allow sliding the PTC device 43 from the projecting end of the visor 52b into the overhang 52, thereby improving workability in assembly.

Other Embodiments

While an embodiment of the present invention has been illustrated, the above embodiment is merely an example for carrying out the present invention. Thus, the present invention is not limited to the above embodiment, and the above embodiment may be modified where necessary without departing the spirit of the present invention.

In the above embodiment, the battery case 2 of the sealed battery 1 is in the form of a cylinder having a rectangular bottom with rounded short sides. However, the battery case may be in other forms, such as a hexagonal cylinder.

In the embodiment above, the visor 52b of the overhang 52 has a recess 52c on the side opposite the side facing the PTC device 43. However, any arrangement that facilitates deformation of the visor 52b toward the PTC device 43 can be employed, such as a groove in the visor 52b or a low-rigidity material replacing a portion of the visor 52b. Further, the low-rigidity portion may be provided on the side facing the PTC device 43, instead of the side opposite the side facing the PTC device 43 of the visor 52b.

In the above embodiment, the visor 52b of the overhang 52 is large enough to cover the entire polymer member 43b of the PTC device 43 in a plan view. However, the visor may only be large enough to cover a portion of the polymer member 43b of the PTC device 43 as far as it prevents properties of the PTC device 43 from changing due to heat from resin.

In the above embodiment, the polymer member 43b of the PTC device 43 and the visor 52b of the overhang 52 are generally in the form of a rectangle in a plan view. However, the polymer member 43b of the PTC device 43 may be in any form, and the visor 52b of the overhang 52 may be in any form as far as it covers the polymer member 43b of the PTC device 43.

In the above embodiment, the sealed battery 1 is a lithium-ion battery. However, the sealed battery 1 may be a battery other than a lithium-ion battery.

In the above embodiment, the temperature protection device is a PTC device 43. However, a device of any structure that can serve as a temperature protection device and needs to be protected from heat from resin when resin is formed may be used.

The invention claimed is:

1. A sealed battery comprising:
a columnar battery case encapsulating a chargeable/dischargeable electrode assembly and electrolyte in an interior and having a vent that cleaves up when a pressure in the interior exceeds a threshold;
a cover that covers at least a portion of an outer surface of the vent of the battery case to prevent the vent from being covered with resin which is formed on the battery case;
a temperature protection device electrically connected with a terminal of the battery case and capable of blocking electric current when a temperature exceeds a threshold; and
two connection lines connected with the temperature protection device,
wherein the cover includes an overhang located to cover at least a portion of the temperature protection device when the temperature protection device is mounted on the cover,
the overhang includes a visor covering a side of the temperature protection device opposite a side thereof facing the battery case and a support that supports the visor and covers the temperature protection device from a side, and is L-shaped in a cross section to cover the temperature protection device from at least two directions,
the temperature protection device is at least partially covered with the overhang and, together with the cover, covered with the resin, and
the visor has a low-rigidity portion with a rigidity lower than in another portion to allow the visor to be deformed toward the temperature protection device.

2. The sealed battery according to claim 1, wherein:
the visor of the overhang is tabular; and
the low-rigidity portion is constituted by a recess provided on a side of the visor opposite the side thereof facing the temperature protection device.

3. The sealed battery according to claim 1, wherein:
the temperature protection device is rectangular in a plan view;
the visor of the overhang is rectangular in a plan view to correspond to the temperature protection device; and
the support is provided on a long side of the visor in a plan view.

4. The sealed battery according to claim 1, further comprising:
a protection circuit; and
a connecting wire connecting the protection circuit with a side of the temperature protection device opposite the side thereof connected with a terminal of the battery case,
wherein the protection circuit is located above the cover, and
the connecting wire is bent such that a portion thereof is located on the overhang of the cover.

5. The sealed battery according to claim 1, wherein:
the overhang is formed integrally with the cover.

* * * * *